1,604,445

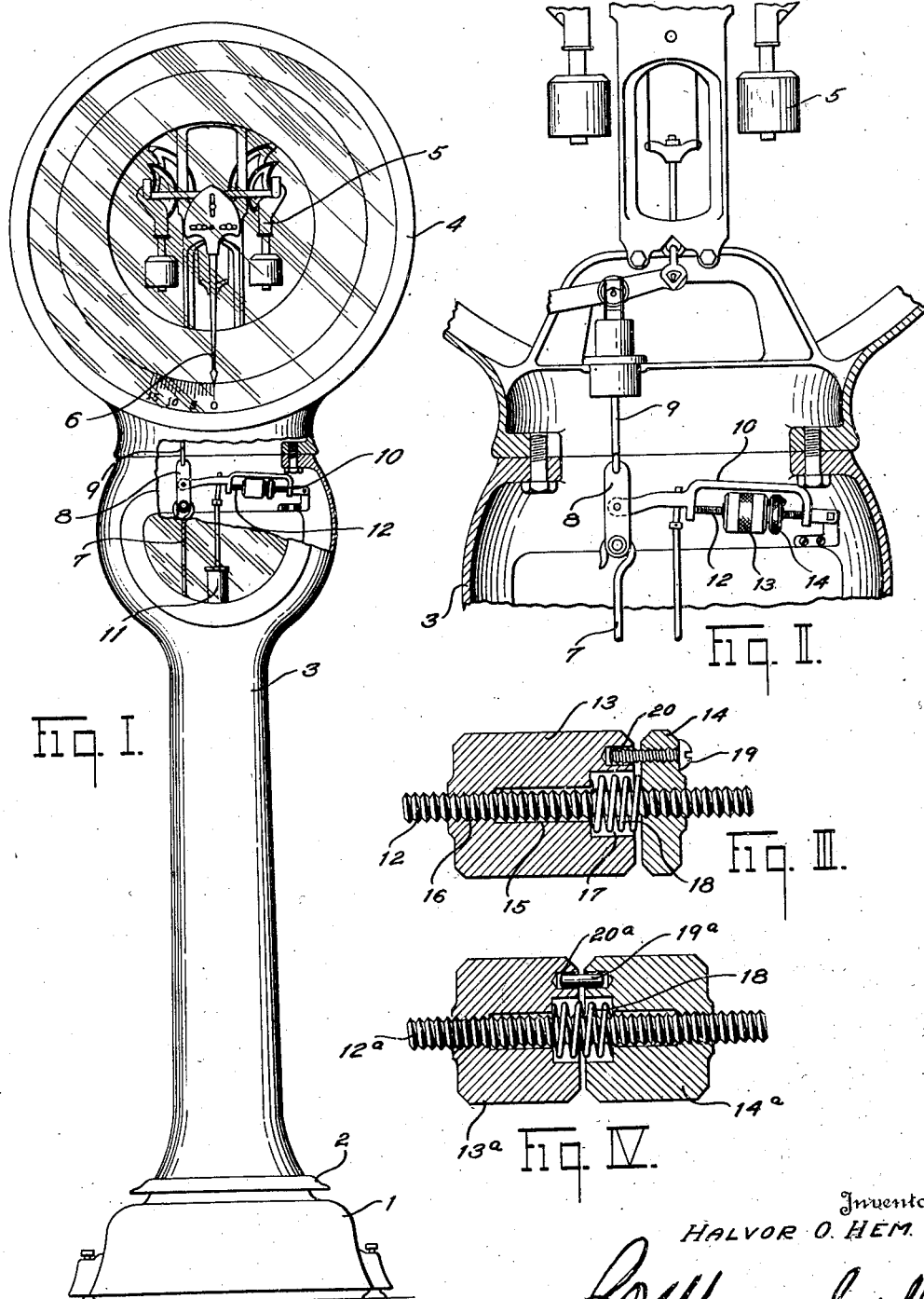
Oct. 26, 1926.
H. O. HEM
SEALING WEIGHT FOR SCALES
Filed Dec. 17, 1923
1,604,445
Inventor
HALVOR O. HEM
By C.W. Marshall
Attorney Patented Oct. 26, 1926.

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

SEALING WEIGHT FOR SCALES.

Application filed December 17, 1923. Serial No. 681,038.

This invention relates to weighing scales and particularly to sealing weights therefor, and one of its principal objects is the provision of means whereby such weights are reliably held in adjusted position but are nevertheless capable of quick and easy adjustment.

Another object of the invention is the provision of a sealing weight and a mounting therefor, the parts being so constructed and arranged that the weight is capable of close adjustment and is reliably held in adjusted position, while at the same time its position of adjustment may be quickly and easily changed.

Still another object is the provision of a weight and mounting having the characteristics above set forth which may be economically manufactured by ordinary screw machine operations.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a scale of the so-called person weigher type, part of the housing being broken away to shown a balancing lever equipped with the device of my invention;

Figure II is an enlarged detail fragmentary view of the balancing lever and the parts connected thereto;

Figure III is a still further enlarged vertical sectional view taken through the axis of the balancing weight; and Figure IV is a similar view showing a modification.

The scale in connection with which I have illustrated my invention is of a well known type, having a base 1 above which the load-receiving platform 2 is supported and a column 3 extending upwardly from the rear end of the base, the column being surmounted by a head 4 which contains automatic load-counterbalancing mechanism 5 and an indicator 6. The lever supporting the platform 2 and the automatic load-counterbalancing mechanism 5 are connected by means of a steelyard rod 7 and links 8 and 9. Pivotally supported within the upper end of the column 3 and connected to the link 8 is a balancing or sealing lever 10, which also serves to operate a vibration damping dash pot 11.

Rigidly connected to the lever 10 and extending longitudinally thereof is a worm 12, and threaded upon the worm 12 is a pair of members 13 and 14 which constitute the sealing weight. The member 13 is substantially cylindrical in shape and the worm 12 passes through its axis. The bore through which the worm 12 extends is enlarged, as at 15, throughout the greater part of its length, so that the part 16 of the bore which must be threaded is relatively short.

The member 13 is counterbored, as at 17, at one end to receive an expansive spring 18, and the member 14, which in this form of the device is disc-shaped, is threaded onto the worm 12 into such close proximity to the member 13 that the spring 18 is put under compression. In order that the distance between the members 13 and 14 may remain constant while the sealing device as a whole is moved along the worm 12, it is necessary that the members 13 and 14 turn together, and this result is accomplished by screwing a threaded pin 19 through the member 14 so that the tip of the pin extends into a socket 20 in the member 13.

With the parts arranged as described, the expansive spring 18 exerts a constant pressure on the members 13 and 14 which forces them into binding engagement with the threads of the worm 12 and the sealing device is thus reliably held against accidental shifting upon the worm. Notwithstanding the pressure of the spring, however, the device may be easily turned by hand even though it be located in a somewhat inaccessible place. The surfaces of the members 13 and 14, may, if desired, be knurled to prevent the operator's fingers from slipping when it is attempted to turn the device.

In the form of device shown in Figure IV, the members 13$^a$ and 14$^a$ are identical, both being counterbored to receive a spring 18$^a$ and having sockets 20$^a$ which receive a pin 19$^a$. In assembling this form of the device the members 13$^a$ and 14$^a$ are placed end to end with the spring 18$^a$ and the pin 19$^a$ in position, the spring 18$^a$ being put under compression by pushing the members 13$^a$ and 14$^a$ together, and the device as a whole is then threaded onto the worm 12$^a$.

The operation of this form of device in use is the same as that of the form already described.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a worm, and a two part sealing weight threaded thereon, one of the parts of said sealing weight being counterbored to receive an expansive spring and having a socket receiving a pin which projects from the other of said members.

2. In a device of the class described, in combination, a worm, and a sealing weight threaded upon said worm, said sealing weight consisting of a pair of identical members, each of said members being counterbored to receive a spring and having a socket to receive a pin which projects from the other of said members.

HALVOR O. HEM.